Patented Dec. 13, 1938

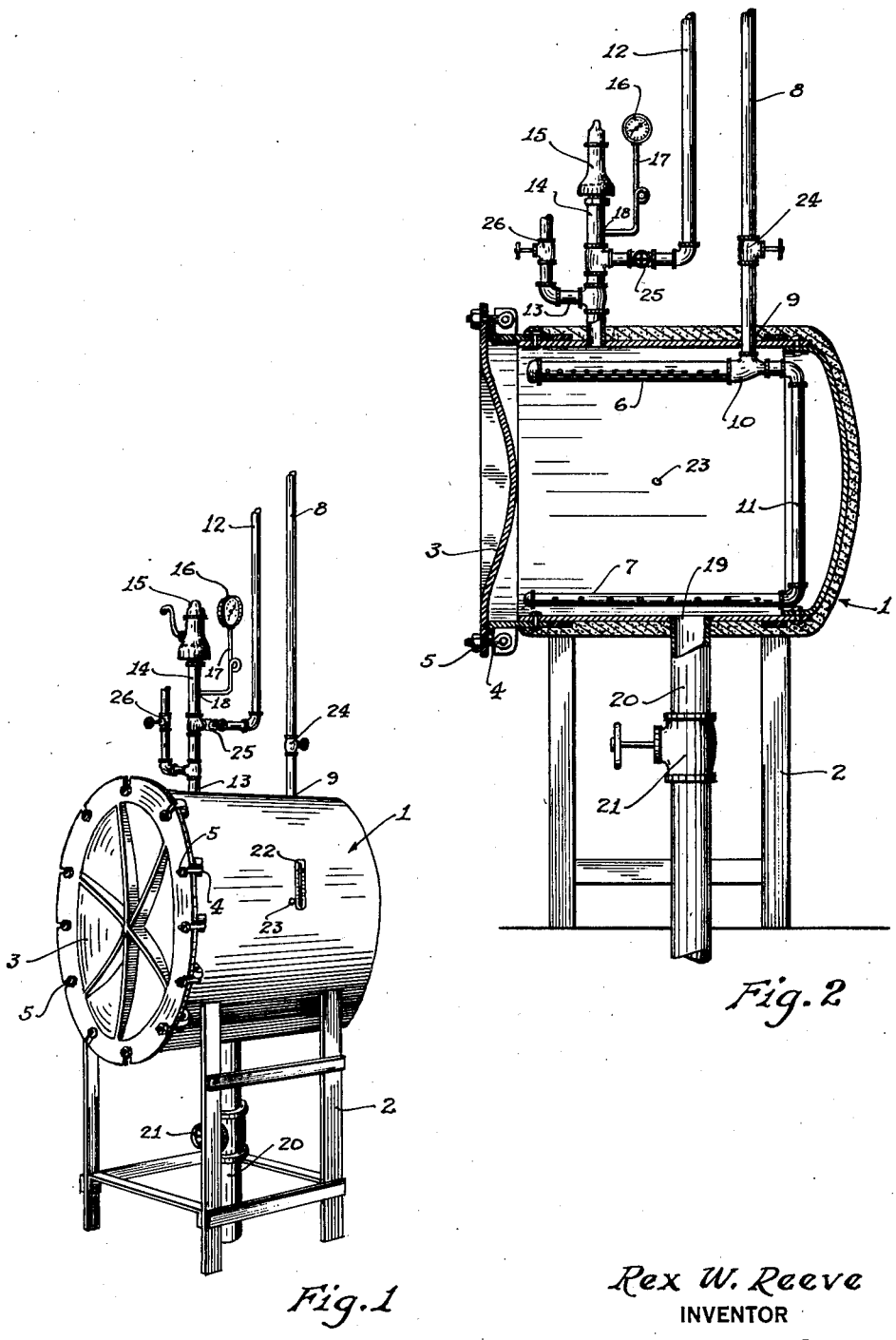

2,140,166

UNITED STATES PATENT OFFICE 2,140,166

TREATMENT OF SAUSAGES

Rex W. Reeve, Palos Park, Ill., assignor to Industrial Patents Corporation, Chicago, Ill., a corporation of Delaware Application December 23, 1936, Serial No. 117,404

4 Claims. (Cl. 99—175)

This invention relates to the treatment of sausages.

One of the objects of the invention is to tender sausage casings.

Another object of the invention is to provide a method for tendering the casing of a stuffed sausage without the use of chemicals.

Other objects of the invention will be apparent from the description and claims which follow.

Suitable apparatus for carrying out the invention is depicted in the drawing.

Figure 1 is a perspective view of a steam retort for treating sausage.

Figure 2 is a side view, partly in section, of the retort shown in Figure 1.

Retort chamber 1 is mounted upon frame 2 and is provided with cover 3 held in place by swivel bolts 4 and nuts 5. Water may be supplied into chamber 1 through perforated headers 6 and 7, being introduced through pipe 8, entering the retort at 9 and communicating with header 6 through T 10 and through pipe 11 to header 7.

Steam is supplied through pipe 12, discharging into the retort. Steam may be exhausted through pipe 13. Riser 14 is provided with safety valve 15 and steam gauge 16 mounted upon pipe 17 connecting with riser 14 at 18. Liquids are withdrawn from the retort at 19 through drain pipe 20, provided with valve 21. The temperature within the retort may be directly read on a thermometer 22 inserted in opening 23.

Pipe 8 is provided with valve 24. Pipe 12 is provided with valve 25. Pipe 13 is provided with valve 26.

In carrying out the present invention, retort 1 is loaded with stuffed sausage, for example, frankfurters. Cover 3 is locked in place and steam admitted through pipe 12. When the desired temperature and pressure have been obtained, the pressure may be relieved. Cold water may be introduced through headers 6 and 7 by opening valve 24.

Different methods have been proposed from time to time for tendering sausage casings, particularly frankfurter casings. Two types of casings are normally employed in the manufacture of frankfurters; sheep casings, which are tender and readily eaten, and hog casings, which are normally tough and often difficult to masticate.

The tenderness of sheep casings renders them high in price and greatly increases the cost of frankfurters with which sheep casings are employed. It is desirable, therefore, to provide a tender hog casing.

The present invention contemplates exploding the casing after it is stuffed with sausage meat without any effect on the meat product in the casing from the exploding of the casing or the use of heat.

The invention is carried out by placing the frankfurters in a retort, such as is shown in the drawing, by way of illustration but not by way of limitation, and subjecting the frankfurters to direct contact with pressure steam for a period of time just long enough to raise the temperature of the casing without allowing the heat to penetrate any appreciable distance into the interior of the frankfurters. The pressure is then released very suddenly so that the moisture in the casing suddenly expands by evaporation to partially break or rupture the tissue of the casing. The desired amount of tendering may be secured by control of the variables of steam pressure, time of application of steam pressure, and time of releasing of steam pressure. In addition to tendering the casings, the process plumps the frankfurters and gives them an attractive appearance, eliminating wrinkles, and developing a smoother, more velvety appearance than is the case with frankfurters not treated in accordance with the present invention.

The higher the steam pressure used, the shorter will be the time required to tender the casing. When the steam pressure is high, for example 75 to 125 pounds per square inch and the time of application is short, for example 3 to 10 seconds, there will be little penetration of heat into the sausage. When the sausage does not heat, it does not expand and, consequently, the casings do not burst. However, if the steam pressure used is low, the time required to tender the casings is excessive with the result that the heat penetrates through the casing into the sausage meat, causing the sausage meat to expand upon release of pressure with consequent bursting of the casing.

Slow release of steam pressure has the same effect as long application of heat and for the same reasons results in bursting the casings.

It is impracticable to tender the casings by an explosion process before stuffing because such treatment so weakens the membrane as to bring about increased breakage during stuffing.

The present invention permits the use of a relatively tough, strong casing during the stuffing operations, keeping the casing breakage during stuffing at a minimum and yet permits the production of a tender casing on the sausage by employment of the explosion principle, resulting in a novel sausage product having an exploded tender casing.

In practice, I have found that satisfactory results are secured by building the steam pressure up to 75 pounds per square inch in ten seconds, holding at that pressure for ten seconds and dropping to atmospheric pressure in ten seconds. At 125 pounds pressure I have secured good results by a twelve second process involving five seconds to build up pressure, two seconds of application of the peak pressure and five seconds to return to atmospheric pressure.

It will be understood that details of the present invention may be varied at will without departing from the spirit of the invention as defined in the claims which follow.

I claim:

1. The method of tendering casings on sausages which comprises mechanically partially rupturing the tissue of the casing membrane by treatment with an expansible fluid.

2. The method of tendering casings on sausages which comprises subjecting the sausage casings to an expansible fluid at high temperatures under pressure sufficient to heat the casings without appreciably heating the sausage meat, and then partially rupturing the tissue of the casing membrane by suddenly releasing the pressure.

3. The method of tendering hog casings which comprises stuffing the casings with sausage meat, subjecting the stuffed casings to the action of steam under pressure sufficient to quickly raise the temperature of the casings without appreciably heating the sausage meat, and then suddenly releasing the pressure.

4. The method of treating frankfurters which comprises subjecting the frankfurters to the action of steam at pressures of 75 pounds to 125 pounds per square inch for a period of from 2 seconds to 10 seconds, and suddenly releasing the pressure to weaken the casing membrane.

REX W. REEVE.